(12) United States Patent
Leathers

(10) Patent No.: US 6,782,378 B2
(45) Date of Patent: Aug. 24, 2004

(54) CONCURRENT EVALUATION OF MULTIPLE FILTERS WITH RUNTIME SUBSTITUTION OF EXPRESSION PARAMETERS

(75) Inventor: Burton Leathers, Nepean (CA)

(73) Assignee: Cognos Incorporated, Ottawa (CA)

( * ) Notice: Subject to any disclaimer, the term of this patent is extended or adjusted under 35 U.S.C. 154(b) by 87 days.

(21) Appl. No.: 09/751,642

(22) Filed: Dec. 29, 2000

(65) Prior Publication Data

US 2002/0123986 A1 Sep. 5, 2002

(51) Int. Cl.[7] .............................................. G06F 17/30
(52) U.S. Cl. ............................................. 707/2; 707/3
(58) Field of Search ............................ 707/2–5, 103, 707/202, 204; 345/339, 348–349, 965; 717/111, 113, 116; 709/253, 400; 714/12

(56) References Cited

U.S. PATENT DOCUMENTS 5,918,232 A * 6/1999 Pouschine et al. .......... 707/103
6,268,853 B1 * 7/2001 Hoskins et al. ............. 700/117
6,275,818 B1 * 8/2001 Subramanian et al. ......... 707/2

* cited by examiner

Primary Examiner—Uyen Le
Assistant Examiner—Susan Chen
(74) Attorney, Agent, or Firm—Pearne & Gordon LLP

(57) ABSTRACT

The invention introduces a mechanism for analyzing large amounts of data. The end-user selects the various filter expression types and any required parameters used to condense the data, and this allows interactive selection of the most interesting ones as well as the ability to vary parameters for those filter expressions requiring them. These selected filter expressions are used to produce filtered views of the data in the cross-tabulations, so that the end-user gains a better grasp of the significant attributes of the data by having less important data either omitted, or aggregated into arbitrary groups. Because all of the permitted filter expressions are pre-computed there are significant improvements in usability and effectiveness. Further, since the pre-computation of these quite complex functions is performed concurrently there is potential for significant savings in processing resources.

30 Claims, 7 Drawing Sheets

CONCURRENT EVALUATION OF MULTIPLE FILTERS WITH RUNTIME SUBSTITUTION OF EXPRESSION PARAMETERS

TECHNICAL FIELD

The present invention relates to the field of computing. More particularly, it relates to a method for performing analysis of data.

BACKGROUND OF THE INVENTION

The field of database management systems is well known and understood. The increasing size and usage of databases has lead to new problems. In possibly large, possibly sparse cross-tabulations, commonly referred to as cross-tabs, computed from data contained within a database, it is always a challenge to present the end-user with that subset of data with the highest semantic content obtainable. This is done by omitting or consolidating redundant or unimportant information by deleting or aggregating specified rows and/or columns in the cross-tabulation so that only the more useful data is shown.

In the past, various techniques have been used to reduce the amount of information presented to the end-user. These techniques include simple ploys such as removing complete rows or columns of data containing only zero data or no data at all. Other more complex techniques have also been used to aggregate data so that the end-user is not overwhelmed by the sheer quantity of values, many of them sufficiently small that they can be discounted when assessing the overall picture. An example of this approach is the use of the so-called "Pareto rule", which, in summary, postulates that in many sets of data, a large proportion of the data values are small and uninteresting, and thus may with advantage be grouped or 'rolled up' into a pseudo-category named, typically, "Other". (This 'rule' is named for Vilfredo Pareto, an Italian economist and sociologist of the early 1900s. It is based on the unequal distribution of things in the universe, and paraphrased states that "80% of wealth is in the hands of 20% of the population").

Other similar functions, herein referred to as filter expressions, have been adopted to assist the end-user in interpreting data. Each such function generally requires significant ad hoc development, and frequently not all of them have been available to the end-users of any one system. Because of the ad hoc nature of previous implementations, there have been few opportunities to take advantage of the processing savings available if several functions are evaluated at once.

Typical end-users of large databases are not always familiar with or even aware of, these functions, and in consequence are not able to manipulate the data effectively.

What is needed is an improvement in the usability of databases and in efficiency of processing the data.

SUMMARY OF THE INVENTION

According to the invention, there is provided a computer-based method of evaluating data by selecting the highest semantic content of a table of data, comprising the steps of: constructing a cross-tabulation of data from one or more databases; ascertaining filter expressions to be applied to said cross-tabulation of data; evaluating said filter expressions using said cross-tabulation of data; and storing the results of said evaluation in a status table. In this context, semantic content is defined as that the informational content that is most meaningful or significant within the table, particularly for the current user.

The present invention introduces a mechanism to overcome the limitations of the existing methods for analyzing large amounts of data, which improves their usability as well as efficiency of processing. Examination of the problem led to the realization that there is indeed a relatively small number of possible filter expressions, or rather, filter expression types, which are useful in the context of manipulating cross-tabulations, particularly, but by no means limited to, large sparse ones. Typically, the end-user is presented with a list from which to select the various filter expression types used to condense the data, and this allows interactive selection of the most interesting ones.

The invention is a computer-based method of evaluating data by selecting the highest semantic content of a table of data. This is achieved, in one embodiment, by constructing a cross-tabulation of data from one or more databases, then ascertaining which filter expressions are to be applied to the data. The results of the evaluations of the filtering expressions using the data are then stored in a status table for later use.

In addition to permitting the end-user to select the filter expressions to be applied to the cross-tabulations, the invention allows the end-user to choose parameters or arguments for those filter expressions requiring them. All of the selected filter expressions can then be used as 'filters' of the data in the cross-tabulations, so that the end-user gains a better grasp of the significant attributes of the data by having less important data either omitted, or aggregated into arbitrary groups.

An additional benefit of the invention is that faster presentation (or evaluation and display) of the results occurs because all of the permitted filter expressions can be pre-computed. This faster presentation leads to significant improvements in usability and effectiveness.

It can also be seen that in geographically dispersed systems, any reduction of the quantity of data presented to the end-user provides the additional benefit of lessening the system resources required to transfer that data between locations.

In some instances, the invention involves the pre computation of quite complex functions. Although this can be expensive in processing time, the improvements in end-user results and presentation speed, as well as the resultant savings in data transfer volumes, often outweigh this cost. Pre-computation is especially beneficial when it is anticipated that the table will be used multiple times, which is more likely where the end-user is analyzing the data interactively. Further, when performed concurrently, the computation cost for several parameters used in selected functions does not increase linearly with the number of parameters, but rather each is a relatively small incremental cost. Overall, concurrent pre-computing of multiple filters has the potential for significant savings in processing resources.

Although the primary benefit of the invention is to improve computational efficiency and provide enhanced end-user functionality, there are further benefits for client/server and similar network-based environments. The invention permits, indeed encourages, the end-user to make decisions which ultimately reduce the amount of data required to be transmitted across the network.

The environment in which the present invention is used is that of a general purpose computing facility connected with a number of databases. It is typically used by a number of simultaneous end-users, although that aspect is not relevant to the operation of the invention. The computing facility may comprise a number of interconnected computers, and the databases and users may be co-located or remotely located. Interconnection of these elements, whether or not co-located, might be over a network such as the Internet.

Other aspects of the present invention will become apparent to those ordinarily skilled in the art upon review of the following description of specific embodiments of the invention in conjunction with the accompanying drawings.

DESCRIPTION OF PREFERRED EMBODIMENTS

Figure 1:
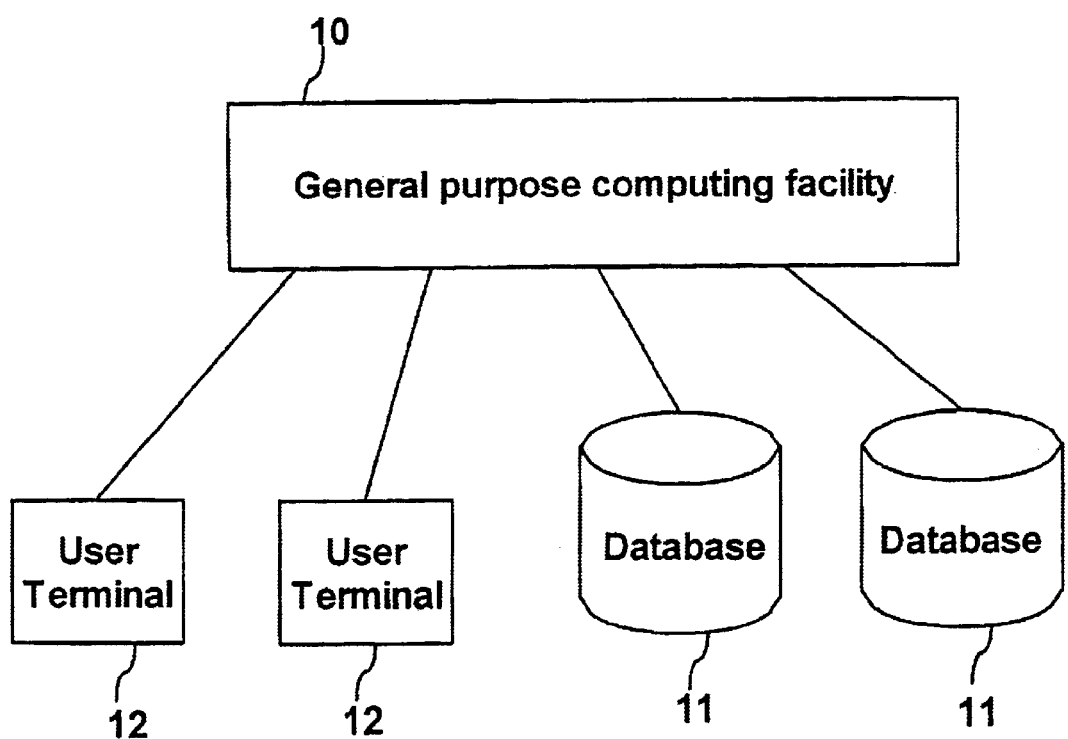
FIG. 1 shows the computing environment typically used in implementing the preferred embodiment of the invention.

Referring to FIG. 1, the invention is implemented as software running on a general purpose computing facility 10 which has access to a number of database repositories 11, capable of performing SQL or equivalent functions, and is typically used by a number of end-users 12.

Filter Expressions

A filter expression is any logical predicate with a single unbound variable, which is evaluated by taking the value of a cell within a cross-tabulation as the value of the unbound variable. The preferred embodiment is assumed to contain an expression evaluation facility capable of evaluating arbitrary logical predicates.

The simplest filter expression is an arbitrary logical predicate in the form of a function with a single real valued argument (the cell value): e.g. $V_{ij}>1.23$, where $V_{ij}$ is the value in the cell at the intersection of the i'th row and the j'th column. The functions may be arbitrarily complex and may involve arithmetic functions such as ABS, MOD or SQUARE_ROOT; comparison operators such as LESS THAN (<) or NOT EQUALS (≠) as well as logical operators such as AND or NOT. The cell value $V_{ij}$, which is the argument to the function, may appear arbitrarily many times within the function. A typical filter expression of this type would determine whether each of the values fell within a specified range. This is expressed as:

$(V_{ij}>1.23 \& V_{ij}<4.56)$.

A richer repertoire of filter expressions may be obtained if the expressions may contain functions which take as an argument the entire set of values within the cross-tabulation. For example, the mean (average) value of the cells within a cross-tabulation may be represented as $f(V)$ where $f$ represents the particular function and V represents the full set of values within the entire cross-tabulation. An arbitrary predicate thus has the general form, $f(V_{ij}, f_1, f_2 \ldots f_n)$. A typical filter expression of this type would test whether the value in a cell is 2 standard deviations above the mean, This is expressed as:

$((V_{ij}-MEAN(V))/(2*SQUARE\_ROOT(VARIANCE(V))>2)$.

Many of the interesting functions of the form $f(V)$ are made more useful if they may be parameterized. For example, the percentile function which finds the value which is larger (or smaller) than a specified percentage of the values of set is more useful if the percentage can be defined. Thus a useful form of the percentile function takes two arguments: a set containing the values in the cross tabulation and a number between 1 and 99 indicating the percentage. The full form is thus $f(V, c)$, where c is the control value which controls the evaluation of the function. A typical filter expression of this type would determine whether each of the values fell between the first and third quartiles for the values in the table. This is expressed as:

$(V_{ij}>\text{BOTTOM\_PERCENTILE}(V, 25) \& V_{ij}<\text{TOP\_PERCENTILE}(V, 25))$.

The result of evaluating a function of the form or $f(V)$ or $f(V, c)$ is termed a run time parameter of the filter expression.

Selection of Parameter Types

Unlike the basic logical predicate in the form of a function with a single real valued argument, the filter expression containing functions evaluated over the set V cannot be simply expressed because the definition of bow to compute the functions $f(V)$ or $f(V, c)$ can be quite complex. A practical embodiment must constrain the $f(V)$ or $f(V, c)$ to a predefined set.

The types of run time parameter values which can be defined for inclusion within simple logic predicates are without theoretical limit but a practical set would be based on: a) counts; b) sums; c) extreme values; d) central and non-central moment statistics, including the mean and standard deviation; e) order statistics, including percentiles, deciles, quartiles and the median; f) values or cumulative sums at specified ordinal positions.

Twelve functions over the set of values in the cross-tabulation which have been chosen as being these with the highest utility for the types of data under consideration are defined for use here. Six of these expressions are simple (or univariate) run time parameters —$f(V)$— and a further six are run time parameters with control values provided by the end-user —$f(V, p)$. They appear in Table 1.

TABLE 1

| Expression Type | Examples | |
|---|---|---|
| Simple statistical expressions | Count | Standard Deviation |
| | Sum | Maximum |
| | Mean | Minimum |
| Statistical expressions with control values | Top Count n | Bottom Percentile n |
| | Bottom Count n | Top Sum n |
| | Top Percentile n | Bottom Sum n |

All of these filter expressions are well understood in the art. The following brief definitions are included for reference.

Top Count n: The n'th largest value in the set V.

Bottom Count n: The n'th smallest value in the set V.

Top Percentile n: In a size ordered set of values, the smallest value in the set of maximal values which constitute n % of the set V.

Bottom Percentile n: In a size ordered set of values, the largest value in the set of minimal values which constitutes n % of the sum for the set V.

Top Sum n: The value in a size ordered set of values which is smaller than the set of maximal values which sum to n % of the sum for the set V.

Bottom Sum n: The value in a size ordered set of values which is larger than the set of minimal values which sum to n % of the sum for the set V.

It will be obvious to an ordinarily skilled practitioner of the art that more filter expressions, both simple (e.g. mode) and with control values (e.g. explicit deciles), could be added to the list in Table 1, but they would have little value in most domains. However, their inclusion or exclusion does not change the nature of the invention.

OPERATION OF THE PREFERRED EMBODIMENT

Figure 2:
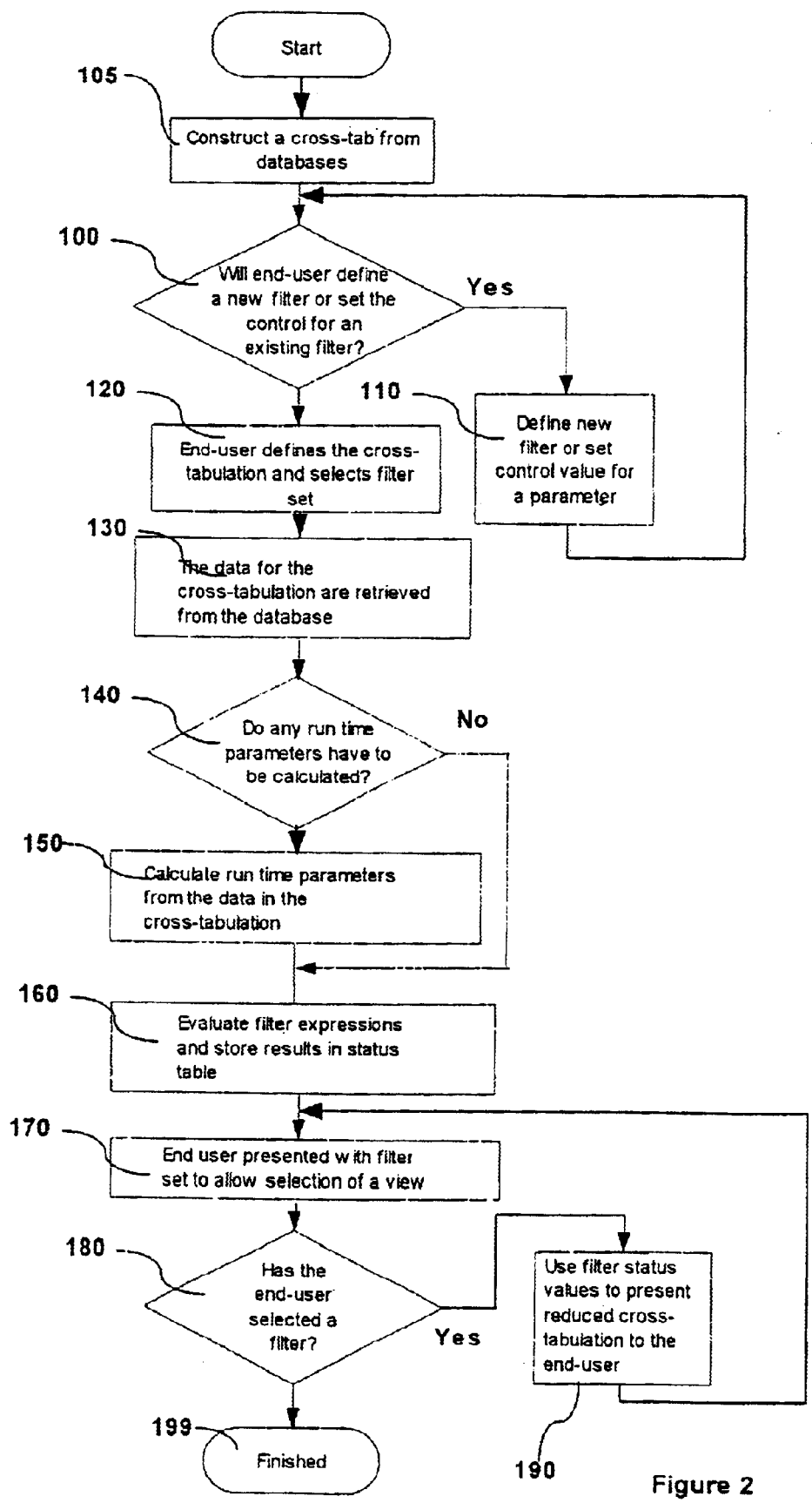
FIGS. 2, 2a, 2b and 2c depict a flowchart of the operation of a preferred embodiment of the invention, from the end-user's perspective.
Figure 2A:
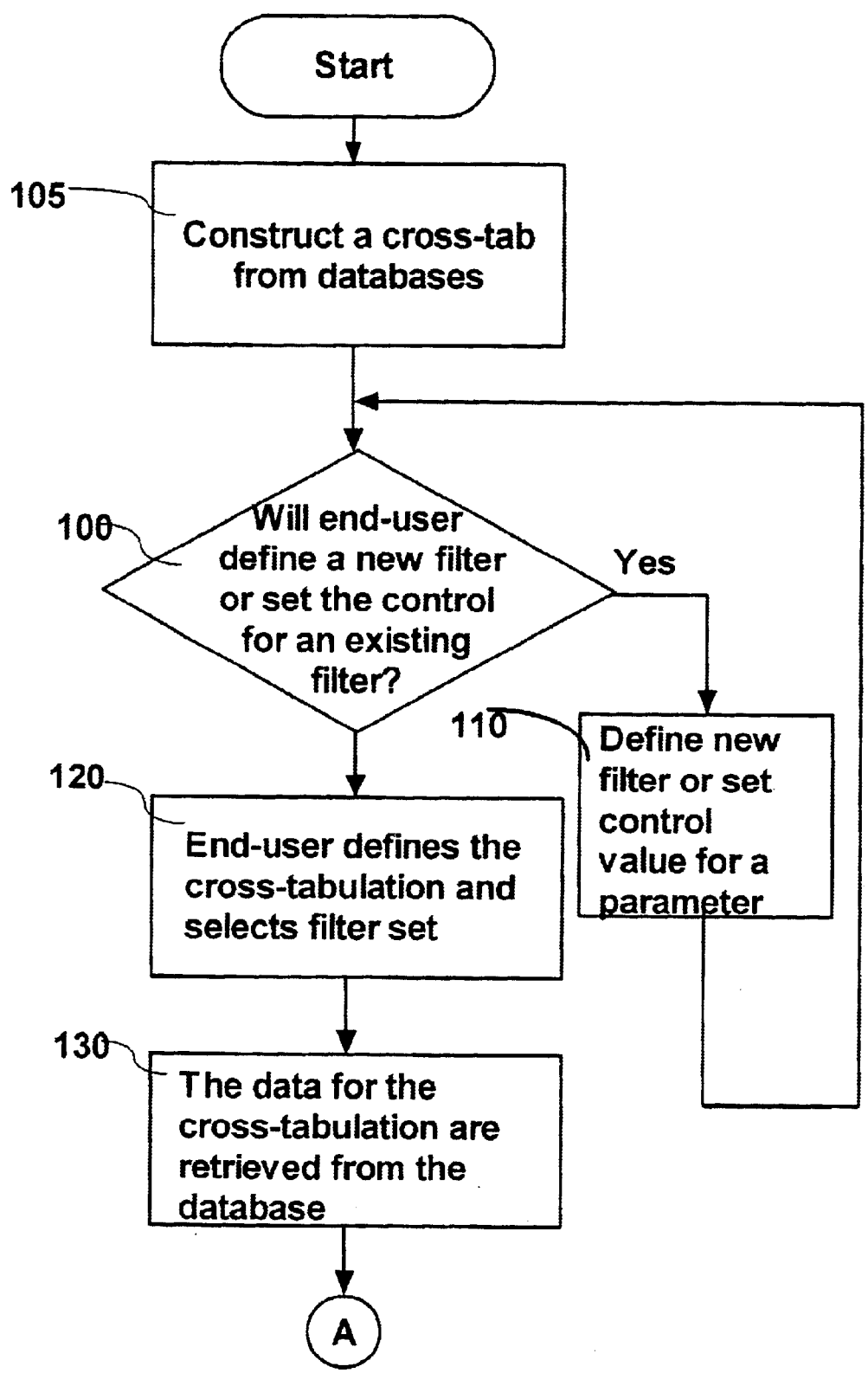
Figure 2B:
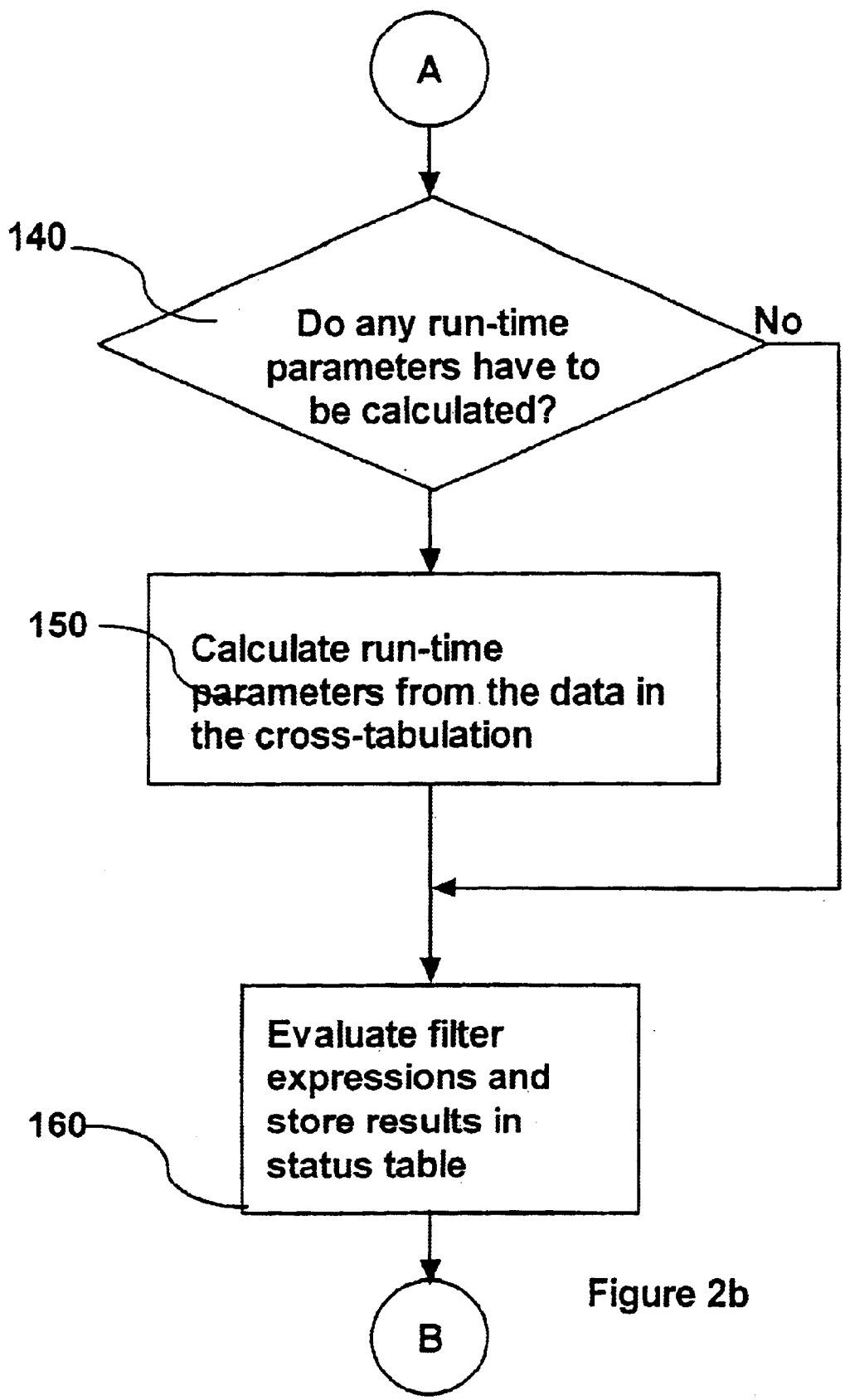
Figure 2C:
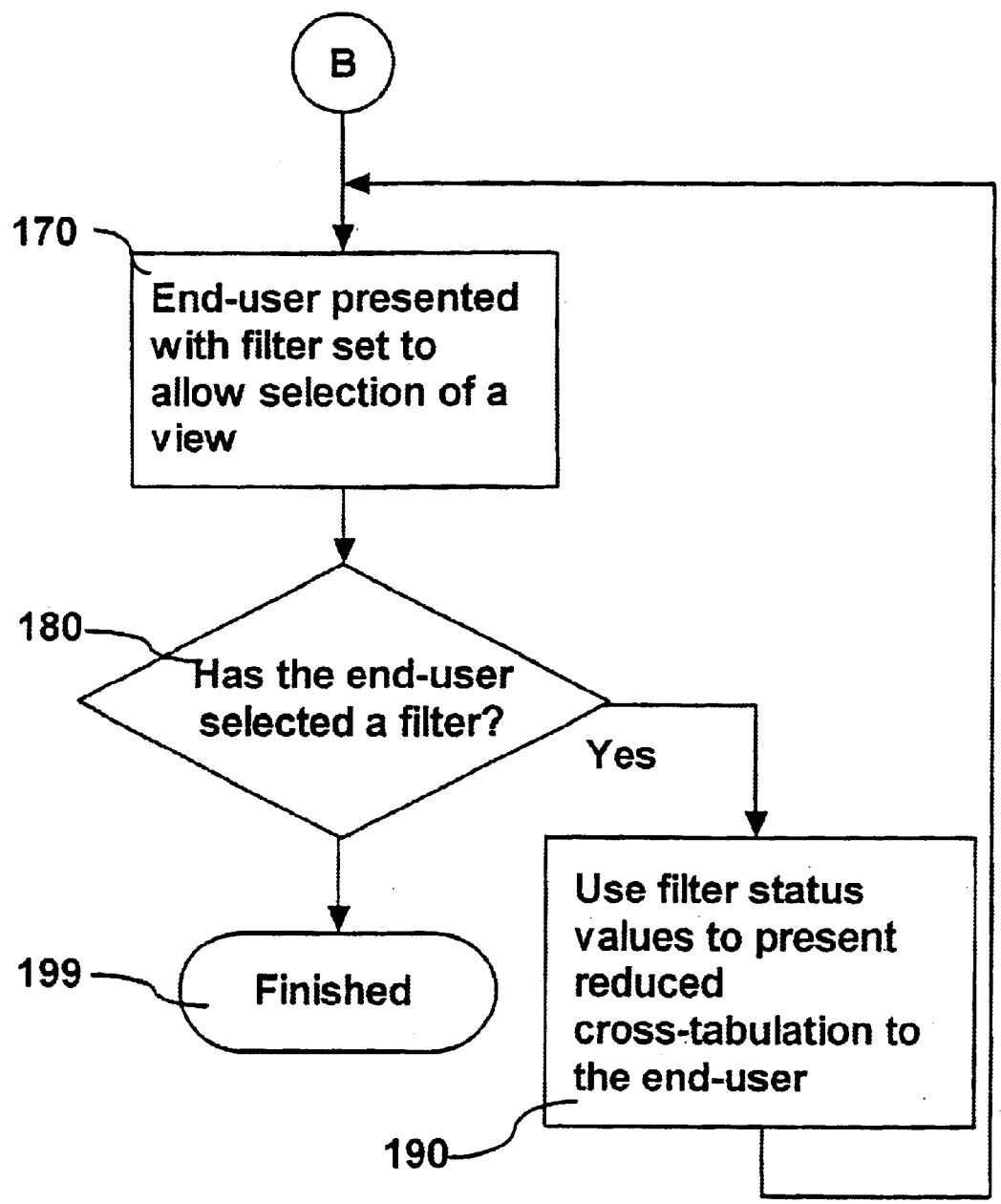
Figure 3:
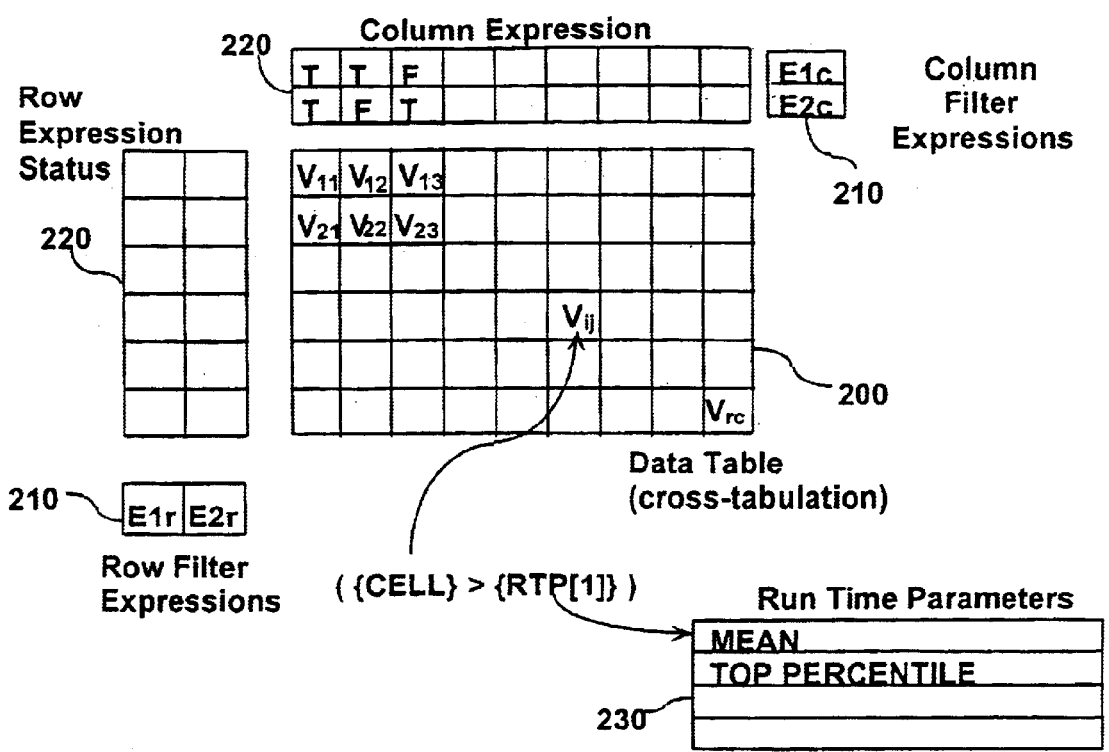
FIG. 3 shows, in a somewhat simplified manner, the various tables required to implement a preferred embodiment of the invention.
Figure 4:
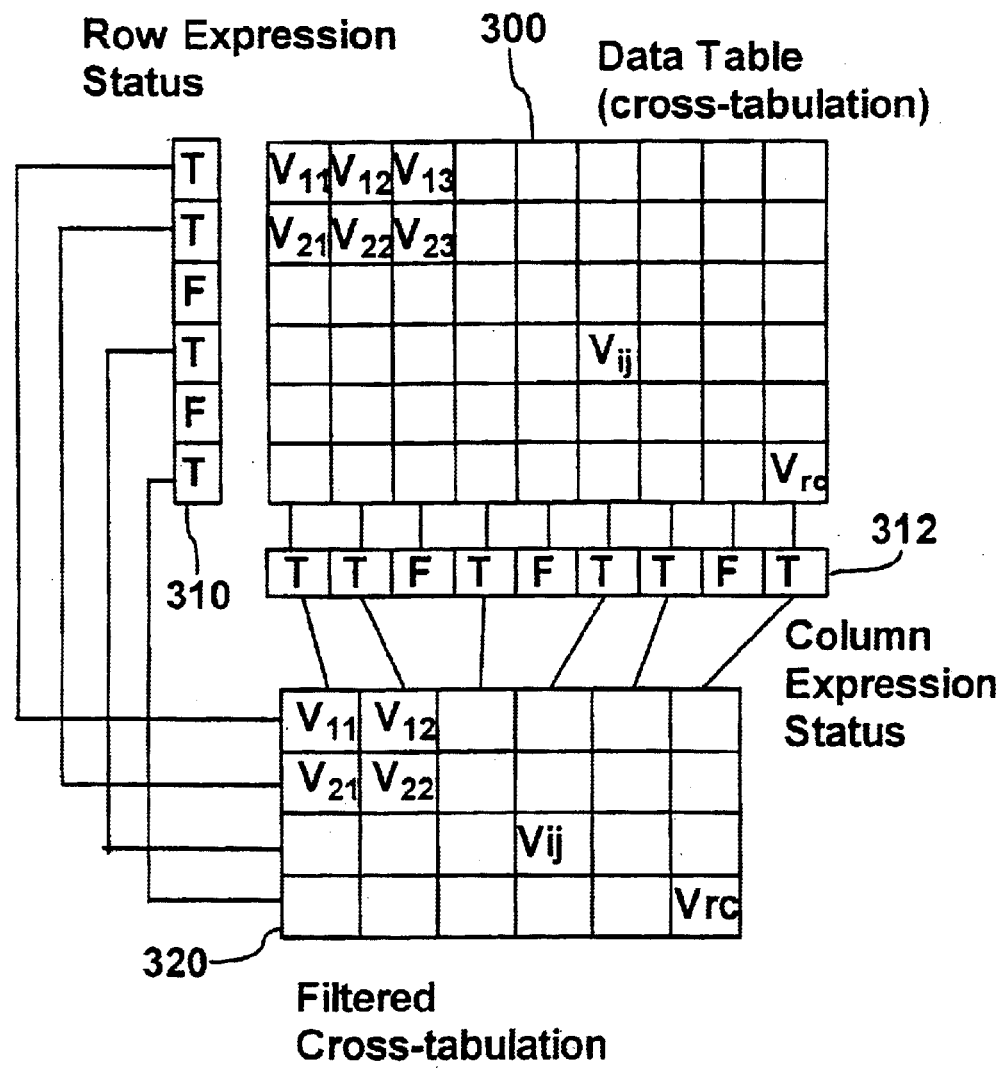
FIG. 4 shows how the filter status data can be used to produce many filtered views from a base cross-tabulation for which multiple filters have been evaluated.

The flowchart FIG. 2 and the FIGS. 3 and 4 illustrate a preferred embodiment of the present invention in which an end-user interacts with the computing system and data. Referring to FIGS. 2 and 3, in the first step to be considered 105 a cross-tabulation of the data is constructed. At step 100 the end user may elect to ascertain and construct filter expressions from primitives with the help of an expression editor and, where a parameter is required for the filter expression, may elect to provide that information as well. In the next step 110, the end user constructs expressions from primitives with the help of an expression editor and, where a parameter is required for the filter expression, provides that information. Subsequently, the end user 120 selects the data to be examined, as well as the preferred filter expressions to be used in manipulating the data, which are stored in 210. The data are retrieved 130 from the appropriate database repository and stored in the cross-tabulation 200. The computing system examines the filter expressions 140 selected by the end-user 120 and, if required, the parametervalues are evaluated and stored 150 in the Run Time Parameter table 230 as previously described. In turn, the selected filter expressions are then evaluated 160 for each data value and the results are stored in the appropriate Expression Status table 220. In turn the expression status values for each row and column are computed and stored 150 in the appropriate filter expression tables 210. The filter set is displayed 170 to the end-user to permit selection of the desired view. Referring now also to FIG. 4, if the end-user makes a selection 180, the computing system filters the Data Table 300 according to the Expression status information for the rows 310, and the Expression status information for the columns 312 and presents 190 a filtered cross-tabulation 320 to the end-user. Finally, if no further filtered views are requested, the process terminates 199.

EXAMPLE USING THE INVENTION

The utility of the invention is further explained by way of the following example.

Consider a situation in which a manager wishes to produce a list of those salespeople who have consistently had gross sales above the mean for every quarter of the year (and give them bonuses!), and also another list of those salespeople who have NEVER been in the top 25% of gross sales for any quarter during the year (and replace them!).

First, a temporary (or ephemeral) data table known as a 'cross-tabulation' is created (from information stored in a database repository) in which the 'rows' represent individual salespeople, and 'columns' represent calendar quarters, values in the table being the gross sales by salesperson/quarter.

For both the 'rows' and 'columns' there is also created a set of 'filter expressions', selected or determined by the manager from a list of possible filter expressions. Multiple filter expressions can be requested simultaneously by the manager, if desired. The set of filter expressions may be the same for the rows and columns but need not be.

The set of rows in the cross-tabulation and the set of filter expressions for the rows imply a table of 'expression status values' which has as many rows as the number of rows in the cross-tabulation and as many columns as the number of filter expressions associated with the rows. Each of these 'expression status values', once computed, has the value 'True' or 'False': 'False' meaning that there is at least one cell value in the row for which the filter expression evaluates to False; 'True' meaning that for all cell values in the row, the filter expression evaluates to True. There is likewise a set of filter expressions and an expression status value table for columns to which the foregoing applies mutatis mutandis.

In this example, the manager chose two filter expressions, one based on Mean and the other on Top Percentile (25). The system can construct on demand a display table consisting of either:

Salespeople whose sales in the previous four quarters are above the Mean, or

Salespeople who have not been in the Top 25 Percentile in any of the preceding four quarters.

The system, when requested to display the data as requested by the manager then creates another (viral) table comprising only those rows and columns for which the selected 'expression status values' are 'True'. This can be achieved by examining the 'expression status values' for appropriate rows (i.e., for each Salesperson) without incurring the significant cost of processing and other resources in recomputing these status values each time.

The manager can apply, or re-apply, multiple filters with a low computational (and time) cost because the time-consuming operations of data retrieval and selector calculation have already been performed.

The invention can be implemented in digital electronic circuitry or in computer hardware, firmware, software or in combinations thereof. Apparatus of the present invention can be implemented in a computer program product tangibly embodied in a machine-readable storage device for execution by a programmable processor. The method of the present invention can be performed by a programmable processor executing a program of instructions to perform the functions of the invention by operating on input data and generating output.

Numerous modifications, variations and adaptations may be made to the particular embodiments of the invention described above without departing from the scope of the invention, which is defined in the claims.

What is claimed is:

1. A computer-based method of evaluating data in a general purpose computing facility, comprising the steps of:
   a) constructing a cross-tabulation of data from one or more databases;
   b) ascertaining from an end-user a first set of filter expressions to be applied to said cross-tabulation of data;
   c) evaluating said cross-tabulation of data using said first set of filter expressions to obtain results and storing said results of said evaluations in a status table, such that said status table contains, for each row of said cross-tabulation and for each column of said cross-tabulation, a True indication where all elements of said row or said column evaluate to True values, and otherwise a False indication;
   d) ascertaining from an end-user a second set of filter expressions, selected from said first set of filter expressions, to be used in creating a reduced view of said cross-tabulation of data;

e) using said second set of filter expressions and said status table to determine rows and columns to be reduced in a view of said cross-tabulation of data, and to complete a reduced view; and f) presenting an end-user with said reduced view.

2. The method of claim 1 further comprising the step of;

g) repeating steps d), e), and f) to give an end-user different reduced views of said cross-tabulation of data.

3. The method of claim 1 further comprising, after step b), the steps of:

b1) determining a third set of filter expressions, said third set comprising those filter expressions in said first set requiring arguments to be provided by an end-user; and b2) ascertaining from an end-user one or more arguments to complete said filter expressions within said third set of filter expressions.

4. The method of claim 3 further comprising the step of;

g) repeating steps d), e), and f) to give an end-user different reduced views of said cross-tabulation of data.

5. The method of claim 1 further comprising, after step b), the steps of:

b3) determining a fourth set of filter expressions, said fourth set comprising those filter expressions in said first set of filter expressions requiring arguments to be provided by parameters contained within said cross-tabulation of data; and b4) completing said fourth set of filter expressions using run-time parameters evaluated by a fifth set of filter expressions acting on said cross-tabulation of data.

6. The method of claim 5 further comprising the step of;

g) repeating steps d), e), and f) to give an end-user different reduced views of said cross-tabulation of data.

7. The method of claim 1, wherein the steps b) and d) are performed with the assistance of an expression editor.

8. The method of claim 1 wherein each filter expression within said first set of filter expressions is assembled using one or more functions each selected from the group consisting of a) counts, b) sums, c) extreme values, d) central and non-central moment statistics including the mean and standard deviation, e) order statistics, including percentiles, f) values or cumulative sums at specified ordinal positions.

9. The method of claim 8 wherein an expression editor is used to assemble more complex filter expressions by combining two or more filter expressions from said first set of filter expressions using logical operations, including AND and OR.

10. A computer-based method of evaluating data in a general purpose computing facility comprising the steps of:

a) constructing a cross-tabulation of data from one or more databases;

b) ascertaining from an end-user, using an expression editor, a first set of filter expressions to be applied to said cross-tabulation of data, each filter expression within said first set of filter expressions being selected from the group consisting of a) counts, b) sums, c) extreme values, d) central and non-central moment statistics including the mean and standard deviation, e) order statistics, including percentiles, f) values or cumulative sums at specified ordinal positions;

c) determining a third set of filter expressions, said third set comprising those filter expressions in said first set requiring arguments to be provided by an end-user;

d) ascertaining from an end-user one or more arguments to complete said filter expressions within said third set;

e) determining a fourth set of filter expressions, said fourth set comprising those filter expressions in said first set of filter expressions requiring arguments to be provided by parameters contained within said cross-tabulation of data;

f) completing said fourth set of filter expressions using run-time parameters evaluated by a fifth set of filter expressions acting on said cross-tabulation of data;

g) evaluating said cross-tabulation of data using said first set of filter expressions to obtain results and storing said results of said evaluations in a status table, such that said status table contains, for each row of said cross-tabulation and for each column of said cross-tabulation, a True indication where all elements of said row or said column evaluate to True values, and otherwise a False indication;

h) ascertaining from an end-user, using an expression editor, a second set of filter expressions selected from said first set of filter expressions, including those more complex expressions assembled using said expression editor by combining two or more filter expressions from said first set of filter expressions with logical operations, including AND and OR;

i) using said second set of filter expressions and said status table to determine rows and columns to be reduced in a view of said cross-tabulation of data, and to complete a reduced view;

j) presenting an end-user with said reduced view; and k) repeating steps h), i), and j) to give an end-user different reduced views of said cross-tabulation of data.

11. A computer-based apparatus for evaluating data in a general purpose computing facility, comprising the following:

a) means for constructing a cross-tabulation of data from one or more databases;

b) means for ascertaining from an end-user a first set of filter expressions to be applied to said cross-tabulation of data;

c) means for evaluating said cross-tabulation of data using said first set of filter expressions to obtain results and storing said results of said evaluations in a status table, such that said status table contains, for each row of said cross-tabulation and for each column of said cross-tabulation, a True indication where all elements of said row or said column evaluate to True values, and otherwise a False indication;

d) means for ascertaining from an end-user a second set of filter expressions selected from said first set of filter expressions, to be used in creating a reduced view of said cross-tabulation of data;

e) means for using said second set of filter expressions and said status table to determine rows and columns to be reduced in a view of said cross-tabulation of data, and to complete a reduced view; and f) means for presenting an end-user with said reduced view.

12. The apparatus of claim 11 further comprising:

g) means for repeating means d), e), and f) to give an end-user different reduced views of said cross-tabulation of data.

13. The apparatus of claim 11 further comprising:

b1) means for determining a third set of filter expressions, said third set comprising those filter expressions in said first set requiring arguments to be provided by an end-user; and b2) means for ascertaining from an end-user one or more arguments to complete said filter expressions within said third set of filter expressions.

14. The apparatus of claim 13 further comprising:
g) means for repeating means d), e), and f) to give an end-user different reduced views of said cross-tabulation of data.

15. The apparatus of claim 11 further comprising:
b3) means for determining a fourth set of filter expressions, said fourth set comprising those filter expressions in said first set of filter expressions requiring arguments to be provided by parameters contained within said cross-tabulation of data; and
b4) means for completing said fourth set of filter expressions using run-time parameters evaluated by a fifth set of filter expressions acting on said cross-tabulation of data.

16. The apparatus of claim 15 further comprising:
g) repeating means d), e), and f) to give an end-user different reduced views of said cross-tabulation of data.

17. The apparatus of claim 11, wherein the means b) and d) include an expression editor.

18. The apparatus of claim 11 including means whereby each filter expression within said first set of filter expressions is assembled using one or more functions each selected from the group consisting of a) counts, b) sums, c) extreme values, d) central and non-central moment statistics including the mean and standard deviation, e) order statistics, including percentiles, f) values or cumulative sums at specified ordinal positions.

19. The apparatus of claim 18 including an expression editor that is used to assemble more complex filter expressions by combining two or more filter expressions from said first set of filter expressions using logical operations, including AND and OR.

20. A computer-based apparatus for evaluating data in a general purpose computing facility, comprising the following:
a) means for constructing a cross-tabulation of data from one or more databases;
b) means for ascertaining from an end-user, using an expression editor, a first set of filter expressions to be applied to said cross-tabulation of data, each filter expression within said first set of filter expressions being selected from the group consisting of a) counts, b) sums, c) extreme values, d) central and non-central moment statistics including the mean and standard deviation, e) order statistics, including percentiles, f) values or cumulative sums at specified ordinal positions;
c) means for determining a third set of filter expressions, said third set comprising those filter expressions in said first set requiring arguments to be provided by an end-user;
d) means for ascertaining from an end-user one or more arguments to complete said filter expressions within said third set;
e) means for determining a fourth set of filter expressions, said fourth set comprising those filter expressions in said first set of filter expressions requiring arguments to be provided by parameters contained within said cross-tabulation of data;
f) means for completing said fourth set of filter expressions using run-time parameters evaluated by a fifth set of filter expressions acting on said cross-tabulation of data;
g) means for evaluating said cross-tabulation of data using said first set of filter expressions to obtain results and storing said results of said evaluations in a status table, such that said status table contains, for each row of said cross-tabulation and for each column of said cross-tabulation, a True indication where all elements of said row or said column evaluate to True values, and otherwise a False indication;
h) means for ascertaining from an end-user, using an expression editor, a second set of filter expressions selected from said first set of filter expressions, including those more complex expressions assembled using said expression editor by combining two or more filter expressions from said first set of filter expressions with logical operations, including AND and OR;
i) means for using said second set of filter expressions and said status table to determine rows and columns to be reduced in a view of said cross-tabulation of data, and to complete a reduced view;
j) means for presenting an end-user with said reduced view; and
k) means for repeating means h), i), and j) to give an end-user different reduced views of said cross-tabulation of data.

21. A computer-readable medium having executable code stored thereon, the code for evaluating data in a general purpose computing facility, comprising:
a) code for constructing a cross-tabulation of data from one or more databases;
b) code for ascertaining from an end-user a first set of filter expressions to be applied to said cross-tabulation of data;
c) code for evaluating said cross-tabulation of data using said first set of filter expressions to obtain results and storing said results of said evaluations in a status table, such that said status table contains, for each row of said cross-tabulation and for each column of said cross-tabulation, a True indication where all elements of said row or said column evaluate to True values, and otherwise a False indication;
d) code for ascertaining from an end-user a second set of filter expressions, selected from said first set of filter expressions, to be used in creating a reduced view of said cross-tabulation of data;
e) code for using said second set of filter expressions and said status table to determine rows and columns to be reduced in a view of said cross-tabulation of data, and to complete a reduced view; and
f) code for presenting an end-user with said reduced view.

22. The computer-readable medium of claim 21 further containing:
g) code for repeating the execution of code in elements d), e), and f) to give an end-user different reduced views of said cross-tabulation of data.

23. The computer-readable medium of claim 21 further containing:
b1) code for determining a third set of filter expressions, said third set comprising those filter expressions in said first set requiring arguments to be provided by an end-user; and
b2) code for ascertaining from an end-user one or more arguments to complete said filter expressions within said third set of filter expressions.

24. The computer-readable medium of claim 23 further containing:
g) code for repeating the execution of code in elements d), e), and f) to give an end-user different reduced views of said cross-tabulation of data.

25. The computer-readable medium of claim 21 further containing:
- b3) code for determining a fourth set of filter expressions, said fourth set comprising those filter expressions in said first set of filter expressions requiring arguments to be provided by parameters contained within said cross-tabulation of data; and
- b4) code for completing said fourth set of filter expressions using run-time parameters evaluated by a fifth set of filter expressions acting on said cross-tabulation of data.

26. The computer-readable medium of claim 25 further containing:
- g) code for repeating the execution of code in elements d), e), and f) to give an end-user different reduced views of said cross-tabulation of data.

27. The computer-readable medium of claim 21, wherein the code for b) and d) contains an expression editor.

28. The computer-readable medium of claim 21 wherein code is provided to assemble each filter expression within said first set of filter expressions using one or more functions each selected from the group consisting of a) counts, b) sums, c) extreme values, d) central and non-central moment statistics including the mean and standard deviation, e) order statistics, including percentiles, f) values or cumulative sums at specified ordinal positions.

29. The computer-readable medium of claim 28 wherein code is provided that includes an expression editor used to assemble more complex filter expressions by combining two or more filter expressions from said first set of filter expressions using logical operations, including AND and OR.

30. A computer-readable medium having executable code stored thereon, the code for evaluating data in a general purpose computing facility, comprising:
- a) code for constructing a cross-tabulation of data from one or more databases;
- b) code for ascertaining from an end-user, using an expression editor, a first set of filter expressions to be applied to said cross-tabulation of data, each filter expression within said first set of filter expressions being selected from the group consisting of a) counts, b) sums, c) extreme values, d) central and non-central moment statistics including the mean and standard deviation, e) order statistics, including percentiles, f) values or cumulative sums at specified ordinal positions;
- c) code for determining a third set of filter expressions, said third set comprising those filter expressions in said first set requiring arguments to be provided by an end-user,
- d) code for ascertaining from an end-user one or more arguments to complete said filter expressions within said third set;
- e) code for determining a fourth set of filter expressions, said fourth set comprising those filter expressions in said first set of filter expressions requiring arguments to be provided by parameters contained within said cross-tabulation of data;
- f) code for completing said fourth set of filter expressions using run-time parameters evaluated by a fifth set of filter expressions acting on said cross-tabulation of data;
- g) code for evaluating said cross-tabulation of data using said first set of filter expressions to obtain results and storing said results of said evaluations in a status table, such that said status table contains, for each row of said cross-tabulation and for each column of said cross-tabulation, a True indication where all elements of said row or said column evaluate to True values, and otherwise a False indication;
- h) code for ascertaining from an end-user, using an expression editor, a second set of filter expressions selected from said first set of fitter expressions, including those more complex expressions assembled using said expression editor by combining two or more filter expressions from said first set of filter expressions with logical operations, including AND and OR;
- i) code for using said second set of filter expressions and said status table to determine rows and columns to be reduced in a view of said cross-tabulation of data, and to complete a reduced view;
- j) code for presenting an end-user with said reduced view; and
- k) code for repeating the execution of the code at elements h), i), and j) to give an end-user different reduced views of said cross-tabulation of data.

* * * * *